Patented Aug. 14, 1945

2,382,213

UNITED STATES PATENT OFFICE 2,382,213

COPOLYMERIZATION OF DRYING OILS AND VINYL COMPOUNDS

Lawrence H. Dunlap, Lancaster, Pa., assignor to Armstrong Cork Company, Lancaster, Pa., a corporation of Pennsylvania No Drawing. Application March 21, 1942, Serial No. 435,716

18 Claims. (Cl. 260—23)

This invention or discovery relates to copolymers of drying oils and vinyl compounds and more particularly to copolymers of a drying oil of the unconjugated system and a vinyl compound selected from the group consisting of styrene and acrylonitrile; and it comprises a copolymer of a drying oil and a vinyl compound selected from the group consisting of styrene and acrylonitrile in which an excess of drying oil is present in the final product; the invention further comprises a process of preparing the copolymers in which a major amount of drying oil and a vinyl compound of the type above described is heated, advantageously at temperatures of about 75° C. to about 135° C., and in the presence of an organic peroxide and a stream of oxygen containing gas until copolymerization is substantially complete; all as more fully hereinafter set forth and as claimed.

Copolymerization occurs when two different polymerizable materials react with each other to give a homogeneous polymer built up from both materials. This polymer usually has much better chemical resistance than the polymer of either of the two materials alone. For example, the copolymer of vinyl chloride and vinyl acetate overcomes the defects of the simple polymer of each substance.

Copolymers of drying oils of the conjugated system and vinyl compounds such as styrene have been prepared heretofore. These copolymers, in addition to being copolymers of conjugated drying oils, contain a large excess of styrene; for example, U. S. Patent to Stoesser et al. 2,190,906, discloses a styrene tung oil copolymer in which the tung oil is present in about .01 to 2.0 per cent by weight of the styrene; and therefore exhibit properties quite similar to styrene itself; that is, the copolymers are hard resinous substances. Although these copolymers are suitable for many uses, they cannot be employed in many fields in which a material having characteristics of a drying oil is required such as in the paint, varnish, and related arts.

I have found that a copolymer of an unconjugated drying oil and a vinyl compound selected from the group consisting of styrene and acrylonitrile, said copolymer having unusually strong resistance to alkali and possessing many of the characteristics of drying oil yet being more resistant to decomposition, may be prepared by heating a mixture of an excess of a drying oil and a vinyl compound of the type described above in the presence of an organic peroxide catalyst, for example, benzoyl peroxide, urea peroxide, acetyl peroxide, and the like, for a period of time sufficient to substantially completely copolymerize the reacting materials. The copolymers prepared according to my invention are comparatively soft gel-like materials which may be readily combined with pigments and fillers in the preparation of coating compositions and plastic compositions. These copolymers possess surprisingly good resistance to alkali.

In carrying out the process of my invention, an unconjugated drying oil, for example, fish oil, linseed oil, soya bean oil, and the like, is mixed with a vinyl compound such as styrene, acrylonitrile, and the like and an organic peroxide catalyst, for example, benzoyl peroxide, urea peroxide, acetyl peroxide, and the like. An unconjugated or nonconjugated drying oil is one which is free of conjugated double bonds; that is, one which does not contain the group,

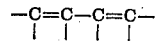

The copolymerization reaction is advantageously conducted at atmospheric pressure. However, sub-atmospheric or super-atmospheric pressure may be employed, but I prefer to operate at substantially atmospheric pressure, because such a process may be easily controlled and conducted economically, in that there is no necessity for the exercise of a careful control of the pressure under which the reaction is carried out. The temperature of the reaction may be varied, but I have obtained advantageous results by operating at temperatures from about 75° C. to about 135° C. When higher temperatures are used, the reaction proceeds much more rapidly, but often a gel develops of such a type that a difficult problem in handling the copolymerized material is presented. At temperatures below about 75° C., the reaction proceeds at a much slower rate, and the degree of copolymerization obtained is low. Ordinarily, copolymerization is substantially completed at about 20 to 50 hours, but a shorter or longer period of time may be required as the temperature of the copolymerization reaction is varied. The reaction may be carried out in a suitable vessel, preferably one which is provided with a suitable inlet and outlet conduit for passing air or other oxygen containing gas through the reaction mixture during the reaction.

In order to obtain copolymerization between the unconjugated drying oil and the vinyl compound, some degree of oxidation of the drying oil is necessary. The drying oil may be oxidized separately before admixture with the vinyl compound. I have found that, in order to obtain a suitable copolymer, the drying oil should be oxidized until a fairly viscous liquid is developed. Drying oils which are subjected to oxidation at 75° C. to 100° C. until they exhibit a viscosity of about 100 to 150 poises have been found to be particularly suitable for copolymerization. However, highly desirable copolymers have been obtained from drying oils oxidized to a greater or lesser viscosity. It may be that by oxidation of the unconjugated drying oil, conjugation is developed in the system due to oxidation at the double bonds. However, I do not intend to limit my invention to any particular theory of operation.

In a particularly advantageous modification of my invention, an unconjugated drying oil, a vinyl compound selected from the group consisting of styrene and acrylonitrile, and an organic peroxide are mixed well and placed in a suitable container. The container contents are subjected to a continuously renewed stream of an oxygen-containing gas, for example, air, and stirred under reflux at temperatures of about 75° C. to about 135° C. until a gel is formed. The copolymers thus obtained are usually soft gels rather than the more liquid copolymers which are obtained when the drying oil is subjected to oxidation before copolymerization, and the oxygen supply to the reaction vessel is not continuously renewed.

The following specific examples are given to illustrate various embodiments of my invention. These examples are given by way of illustration and not by limitation.

Example 1

Two hundred ninety grams of a mixture of oxidized linseed oil, styrene, and benzoyl peroxide containing 5% by weight of styrene and 1% by weight of benzoyl peroxide were placed in a three-neck flask equipped with a stirrer, a reflux condenser, and an air inlet. The mixture was air blown and stirred under reflux at 85° C. until a soft gel formed. The gel was formed at the end of about thirty-five hours and was insoluble in toluene.

Example 2

Three hundred eighty grams of a mixture containing an oxidized linseed oil obtained by heating linseed oil while agitating in the presence of a continuously renewed supply of air at 55° C. for about six hours, styrene, and urea peroxide containing ten per cent by weight of styrene and one per cent by weight of urea peroxide was well mixed and added to a three-neck flask equipped with a stirrer, reflux condenser, and an air inlet. The mixture was air blown and stirred under reflux at about 95° C. until a soft gel formed. The gel was formed at the end of about twenty-five hours and was insoluble in toluene.

Example 3

Four hundred fifteen grams of oxidized linseed oil, obtained by heating a linseed oil containing driers from four to six hours at a temperature of 300° C. in the presence of air to a body of about 148 poises, 10% styrene by weight, and 1% benzoyl peroxide by weight were charged into a hydrogenation bomb. The bomb was sealed and the mixture heated at a temperature of about 125° C. while continuously shaking the bomb for a period of about one and one-half days. At the end of the day and one-half period, a viscous liquid copolymer was obtained.

Example 4

Three hundred twenty-five grams of a mixture of oxidized linseed oil, acrylonitrile, and benzoyl peroxide, containing about 5% by weight of acrylonitrile and about 1% by weight of benzoyl peroxide were well mixed and charged into a three-neck flask equipped with a stirrer, a reflux condenser, and an air inlet. The mixture was air blown and stirred under reflux at about 95° C. for a period of about twenty-five hours. At the end of that time a tough copolymer gel was obtained.

In order to demonstrate the homogeneous character of the copolymers obtained by following the processes set forth in the above specific examples, the reaction products obtained were each subjected to steam distillation, fractional solution and extraction analysis. If copolymerization did not occur, the vinyl compound would be either polymerized to a polyvinyl compound or it would remain as unpolymerized monomeric liquid. If unpolymerized vinyl compound were present, it would be removed by steam distillation. Polyvinyl compounds would be removed at least in part by prolonged extraction. Similarly, fractional solution would separate from each other constituents of different composition or of different degrees of polymerization.

Products prepared according to the above specific examples were each steam distilled for thirty minutes until 300 cc. of distillate was obtained. There was no sign of vinyl compound or any other organic liquid in the distillate. The residue was extracted with toluene, but no polyvinyl compound was obtained. The copolymers obtained were insoluble in all common types of organic solvent and also in various mixtures of organic solvents. The weight of the finished copolymer was great enough to show that some vinyl compound remained in the material even after allowing for gain in weight of the oil due to oxidation.

The above examples are given by way of illustration and, therefore, the ingredients and proportions of the ingredients may be varied without departing from the scope of my invention. In all cases a tough gel-like material having the properties of a drying oil with additional and more advantageous properties, such as greater alkali resistance, was obtained.

The alkali resistance of the above copolymers was determined in the following manner.

About 2 grams of a copolymer gel were pressed between rolls of coarse thin cloth at 8,000 pounds per square inch, and uniformly sized strips were suspended in a 5% solution of sodium hydroxide for two hours. The strips were weighed before and after they had been immersed, washed, and dried. The per cent lost in weight was recorded. The per cent lost in weight of each copolymer is listed in the table below:

TABLE I

| Copolymer | Per cent lost |
|---|---|
| Copolymer of Example 1 | 5.0 |
| Copolymer of Example 2 | 4.8 |
| Copolymer of Example 3 | 5.0 |
| Copolymer of Example 4 | 2.8 |
| Mechanically oxidized linseed oil | 8.5 |

It can be seen from the above table that the alkali resistance of the copolymers of my invention is greater than the alkali resistance of oxidized drying oils. It can, therefore, be seen that the copolymers may be used in a wide variety of fields which require a drying oil having a high resistance to alkali.

By the term "a major amount of drying oil" as used in this specification and in the appended claims, I intend to include a mixture or copolymer in which there is present 75% by weight or more of drying oil. I have obtained particularly advantageous results when the reaction mixture contains between 85% and 95% by weight drying oil. When such a proportion of drying oil is present, more workable gels are obtained, and the degree of copolymerization between the drying oil and the vinyl compound is greater.

By the term "oxidized drying oil" as used in this specification and the appended claims, is meant a drying oil which has been subjected to sufficient oxidation to allow copolymerization with a vinyl compound of the type herein described.

Although my invention has been disclosed and described with reference to certain specific embodiments and specific examples, it is not intended that my invention should be limited thereby, but it may be otherwise embodied and practiced within the scope of the appended claims.

I claim:

1. A toluene-insoluble copolymer of oxidized linseed oil and a vinyl compound selected from the group consisting of styrene and acrylonitrile, said copolymer containing about 85% by weight to about 95% by weight of said linseed oil.

2. A toluene-insoluble copolymer of oxidized linseed oil and styrene containing at least 75% by weight of said linseed oil.

3. A toluene-insoluble copolymer of oxidized linseed oil and acrylonitrile containing at least 75% by weight of said linseed oil.

4. A toluene-insoluble copolymer of oxidized linseed oil and a vinyl compound selected from the group consisting of styrene and acrylonitrile, said copolymer containing at least 75% by weight of said linseed oil.

5. The process which comprises heating at least 75% by weight of drying oil free of conjugated double bonds, which oil has been oxidized with not more than 25% by weight of a vinyl compound selected from the group consisting of styrene and acrylonitrile in the presence of an organic peroxide until copolymerization is substantially complete and a toluene-insoluble copolymer is produced.

6. The process which comprises heating a mixture containing about 85% by weight to about 95% by weight of drying oil free of conjugated double bonds, which oil has been oxidized, and about 15% to about 5% by weight of a vinyl compound selected from the group consisting of styrene and acrylonitrile in the presence of an organic peroxide until copolymerization is substantially complete and until a toluene-insoluble copolymer is produced.

7. The process which comprises heating at least 75% by weight of drying oil free of conjugated double bonds, which oil has been oxidized, with not more than 25% by weight of a vinyl compound selected from the group consisting of styrene and acrylonitrile in the presence of an organic peroxide at a temperature of about 75° C. to about 135° C. until copolymerization is substantially complete and a toluene-insoluble copolymer is formed.

8. The process which comprises heating a mixture containing between about 85% by weight to about 95% by weight of drying oil free of conjugated double bonds, which oil has been oxidized, and about 15% to about 5% by weight of a vinyl compound selected from the group consisting of styrene and acrylonitrile in the presence of an organic peroxide at a temperature of about 75° C. to about 135° C. until copolymerization is substantially complete and a toluene-insoluble copolymer is produced.

9. The process which comprises heating a mixture containing not more than 25% by weight of a vinyl compound selected from the group consisting of styrene and acrylonitrile and at least 75% by weight of drying oil free of conjugated double bonds, which oil has been pre-oxidized prior to admixture, said heating being effected in the presence of an organic peroxide until copolymerization is substantially complete and a toluene-insoluble copolymer is produced.

10. The process which comprises heating a mixture containing about 5% to about 15% by weight of a vinyl compound selected from the group consisting of styrene and acrylonitrile and about 95% to about 85% by weight of drying oil free of conjugated double bonds, which oil has been pre-oxidized prior to admixture, said heating being effected in the presence of an organic peroxide until copolymerization is substantially complete and a toluene-insoluble copolymer is produced.

11. The process which comprises heating a mixture containing not more than 25% by weight of a vinyl compound selected from the group consisting of styrene and acrylonitrile and at least 75% by weight of a drying oil free of conjugated double bonds, which has been pre-oxidized prior to admixture, said heating being effected in the presence of an organic peroxide at a temperature of about 75° C. to about 135° C. until copolymerization is substantially complete and a toluene-insoluble copolymer is produced.

12. The process which comprises heating a mixture containing about 5% to about 15% by weight of a vinyl compound selected from the group consisting of styrene and acrylonitrile and about 95% to about 85% by weight of drying oil free of conjugated double bonds, which oil has been pre-oxidized prior to admixture, said heating being effected in the presence of an organic peroxide at a temperature of about 75° C. to about 135° C. until copolymerization is substantially complete and a toluene-insoluble copolymer is formed.

13. The process which comprises heating at least 75% by weight of drying oil free of conjugated double bonds with not more than 25% by weight of a vinyl compound selected from the group consisting of styrene and acrylonitrile in the presence of an organic peroxide while continuously flowing an oxygen-containing gas through the reaction mixture, said heating being effected until copolymerization is substantially complete and a toluene-insoluble copolymer is produced.

14. The process which comprises heating a mixture containing about 85% by weight to about 95% by weight of drying oil free of conjugated double bonds and about 15% to about 5% by weight of a vinyl compound selected from the group consisting of styrene and acrylonitrile in the presence of an organic peroxide while continuously flowing an oxygen-containing gas through the reaction mixture, said heating being effected until copolymerization is substantially complete and a toluene-insoluble copolymer is produced.

15. The process which comprises heating at least 75% by weight of drying oil free of conjugated double bonds with not more than 25% by weight of a vinyl compound selected from the group consisting of styrene and acrylonitrile in the presence of an organic peroxide at a temperature of about 75° C. to about 135° C. while continuously flowing an oxygen-containing gas through the reaction mixture, said heating being effected until copolymerization is substantially complete and a toluene-insoluble copolymer is produced.

16. The process which comprises heating a mixture containing between about 85% by weight and about 95% by weight of a drying oil free of conjugated double bonds and about 15% to about 5% by weight of a vinyl compound selected from the group consisting of styrene and acrylonitrile in the presence of an organic peroxide at a temperature of about 75° C. to about 135° C. while continuously flowing an oxygen-containing gas through the reaction mixture, said heating being effected until copolymerization is substantially complete and a toluene-insoluble copolymer is produced.

17. A toluene-insoluble copolymer of a drying oil free of conjugated double bonds, which oil has been oxidized, and a vinyl compound selected from the group consisting of styrene and acrylonitrile, said copolymer containing at least 75% by weight of said drying oil.

18. A toluene-insoluble copolymer of a drying oil free of conjugated double bonds, which oil has been oxidized, and a vinyl compound selected from the group consisting of styrene and acrylonitrile, said copolymer containing about 85% to about 95% by weight of said drying oil.

LAWRENCE H. DUNLAP.